United States Patent [19]

Friedrichs et al.

[11]  4,125,409
[45]  Nov. 14, 1978

[54] HIGH ALUMINA-CHROMIA PLASTIC REFRACTORY MIX

[75] Inventors: James R. Friedrichs, Lansdale; Edward A. Snajdr, Exton; Bela Klaudinyi, King of Prussia, all of Pa.

[73] Assignee: Combustion Engineering, Inc., Windsor, Conn.

[21] Appl. No.: 862,873

[22] Filed: Dec. 21, 1977

[51] Int. Cl.$^2$ .................. C04B 35/10; C04B 35/12
[52] U.S. Cl. .................................................. 106/66
[58] Field of Search .......................................... 106/66

[56] References Cited

U.S. PATENT DOCUMENTS

| | | | |
|---|---|---|---|
| 3,378,385 | 4/1968 | McCreight et al. | 106/66 |
| 3,888,687 | 6/1975 | Manigault | 106/66 |
| 3,948,670 | 4/1976 | Manigault | 106/66 |

Primary Examiner—James Poer
Attorney, Agent, or Firm—Prutzman, Kalb, Chilton & Alix

[57] ABSTRACT

A new and improved high alumina-chromia plastic refractory mix is provided wherein the predominant aggregate component of fused alumina imparts a strong skeletal aggregate structure of superior uniform heat stability. The matrix is comprised predominantly of materials having a high specific surface area of at least about 0.1 sq. m./g., high purity and a trigonal phase solid solution upon firing. The resultant refractory is characterized by an ability to withstand corrosive-erosive attack of molten metals and their acid, semibasic and basic slags during repeated exposure thereto together with excellent volume stability with minor glass development, superior structural heat stability, low apparent porosity, a high contact angle with molten steel and a strong abrasion resistant matrix.

13 Claims, No Drawings

HIGH ALUMINA-CHROMIA PLASTIC REFRACTORY MIX

BACKGROUND AND SUMMARY OF THE INVENTION

The present invention relates generally to chemically bonded high alumina refractory materials for monolithic or formed shape applications. More particularly, it is concerned with a new and improved ramming or plastic refractory mix well suited for use in the high temperature metallurgical industry for withstanding the corrosive/erosive attack of melten metals and slags thereon during repeated exposure cycles.

Plastic refractory compositions that utilize a chemical bonding system of the phosphate type have been known for some time and the mechanism of the bond formation has been studied extensively. Particular interest has been shown in the high temperature attributes of the resultant refractories, such as the resistance of such material to slag attack and metal penetration and its hot modulus of rupture characteristics. High alumina/chromia refractory compositions have also been known and have generally consisted of tabular and calcined alumina coupled with lesser amounts of chromic oxide. A formulation of this type, which also includes a phosphate bonding compound, is described in U.S. Pat. No. 3,888,687 issued June 10, 1975, and entitled "Alumina-Chrome Refractory".

The present invention relates principally to a high alumina-chromia plastic refractory mix and includes as a principal object the provision for such a refractory having an aggregate portion of superior structural heat stability coupled with a strong abrasion-resistant dense matrix that prevents aggregate deterioration through erosive attack.

Another object of the present invention is to provide a high alumina-chromia refractory composition designed to utilize a pair of matching and sequentially effective bonding systems that provide the green mix with plasticity and integrity during the drying, baking and initial firing operations while facilitating the gradual low temperature initiation of a second, ceramic, bond to replace the initial chemical cohesive forces as the refractory is subjected to higher firing temperatures.

A further object of the present invention is to provide a new and improved high alumina-chromia refractory material having a high purity matrix component adapted to the formation of a solid solution exhibiting a dense, predominantly trigonal phase while suppressing the formation of the unwanted cubic spinel phase, thereby providing a fired matrix that is harder than corundum and strong aggregate bonding that necessitates transgranular rather than intergranular fracture.

Yet another object of the present invention is to provide a new and improved high alumina-chromia refractory composition of the type described which promotes the early development of a ceramic bond within the mix at firing temperatures of about 1350°–1400° C. through the utilization of matrix components exhibiting high specific surface areas and high surface contact between particles.

Still another object of the present invention is to provide a new and improved refractory mix of the type described that exhibits excellent plasticity upon compounding and retention of plasticity over a prolonged shelf life coupled with a lower apparent porosity and low water absorption characteristics. Included in this object is the provision for the utilization of high purity materials within the matrix, particularly materials having low cation levels of iron, magnesium, calcium, and alkali metals that might react with the phosphate binder to form water scavenging acid salts.

A still further object of the present invention is to provide a new and improved high alumina-chromia refractory composition having a small amount of glass forming components such that upon firing it develops a highly viscous, volume stable and pore closing lute for shrinking cracks and closing pores at crystalline growth locations intermediate grain components of the aggregate, particularly at those temperatures where steel slag is most fluid and penetrating thereby providing enhanced resistance against slag penetration.

Other objects will be in part obvious and in part pointed out more in detail hereinafter.

These and related objects are achieved an accordance with the present invention by providing a new and improved high alumina-chromia plastic refractory mix of the type having a general aggregate to matrix ratio of about 2:1 wherein the predominant aggregate component is fused alumina and the matrix is comprised predominantly of materials having a high specific surface area of at least about 0.1 sq. m./g. The combined alumina-chromia content of the mix is in excess of about 80% by weight with the chromia being in sufficient amounts in the matrix to provide a trigonal phase solid solution upon firing. Additionally, the mix components are of high purity and have minimal magnesium oxide, iron oxide, and alkali metal oxide contents to provide improved shelf life and plasticity as well as suppression of a spinel phase formation within the matrix upon firing. The resultant refractory is characterized by an ability to withstand corrosive-erosive attack of molten metals and their acid, semibasic and basic slags during repeated exposure thereto together with excellent volume stability, superior structural heat stability, low apparent porosity and a strong abrasion resistant matrix.

A better understanding of the invention will be obtained from the following detailed description of the composition and its method of manufacture as well as the features, properties and relationships of elements, one with respect to each of the others, as set forth in the following description and illustrative embodiment.

DESCRIPTION OF A PREFERRED EMBODIMENT

As mentioned, the high alumina-chromia refractory mix of the present invention utilizes fused alumina as the predominant aggregate portion with or without other classes of alumina components so as to provide a strong skeletal aggregate structure for the resultant refractory product. The fused alumina is a relatively high purity alumina such as produced by the Bayer process and is typically produced in electric arc furnaces, prior to being crushed and sized to the different mesh sizes to provide the desired uniform product. The fused alumina grains are the densest and hardest of the commercially available bulk alumina products and have a well developed fine corundum crystal structure that gives the product a uniform heat stability superior to other alumina materials such as the lower temperature produced tabular or the even lower temperature manufactured calcined alumina.

As mentioned, the fused alumina may be utilized alone as the sole aggregate material or may be combined with other classes of alumina such as the tabular alumina so long as the predominant aggregate component of the mix is of the fused alumina variety. Although less than 50% fused alumina may be employed in the aggregate portion of the mix, particularly where more than two types of alumina are employed within the composition, it is generally preferred to utilize approximately 50% or more fused alumina. As will be appreciated, however, as the fused alumina content of the aggregate mix is reduced, the resultant superior structural heat stability of the resultant product is diminished. A typical formulation may have a fused alumina/tabular alumina ratio of about 52:48. In this manner, the high purity of the aggregate component is maintained so as to provide the superior structural heat stability within the aggregate component of the mix.

The preferred aggregate size for the fused alumina is at an average mesh size greater than 60 mesh, i.e., about −4 +60 mesh and preferably at a mesh size of −10 +50 mesh. It will, of course, be appreciated that some variation in particle size will be utilized. Where other types of alumina are used, such as tabular alumina, it is generally of the same mesh size or coarser.

The matrix component of the refractory mix should provide a strong abrasion resistant bond for the grains of aggregate material so as to resist erosive attack and prevent the aggregates from being washed out of the refractory product during use. The matrix should be composed essentially of materials having a high specific surface area. More specifically, the matrix includes high alumina products having a very large specific surface area in conjunction with high purity chromium sesquioxide, also with a very high specific surface area, and a chromic oxide content of at least 99%. These materials are combined with a minor amount of a fine plastic clay having a low sodium oxide impurity level.

As mentioned, the matrix should be comprised predominantly of materials having a high specific surface area of at least about 0.1 sq. m/g. It is preferred that the chromium sesquioxide have a slightly higher surface area than the alumina used in the matrix. Thus, calcined alumina having a specific surface area within the range of about 0.1–1.0 sq. m./g. is typically employed while the range for the specific surface area of the chromium sesquioxide typically is greater than 0.4 sq. m./g. and preferably falls within the range of about 0.5–2.0 sq. m./g. as measured by the Coulter Counter technique. While it is known that the smaller grain size materials will exhibit larger specific surface areas, the shape factor of the grains should also be considered since the specific surface area is also dependent on the shape of the granular material utilized. It is particularly important, in accordance with the present invention, to provide as much surface contact as possible between the particles.

A typical grain size distribution for the refractory mix of the present invention is set forth below.

| Grain Size | Percent | Grain Size | Percent |
|---|---|---|---|
| greater than 4.77 mm | 2.4 | 0.30 mm | 5.5 |
| 3.36 mm | 5.4 | 0.20 mm | 3.0 |
| 2.38 mm | 2.4 | 0.15 mm | 2.3 |
| 2.00 mm | 1.4 | 0.10 mm | 2.0 |
| 0.84 mm | 21.0 | 75 microns | 1.7 |
| 0.60 mm | 9.5 | 53 microns | 1.0 |
| 0.42 mm | 8.0 | less than 53 microns | 34.4 |

As can be noted from the foregoing table, approximately 35–40% of the refractory mix has a grain size of less than 100 microns. This corresponds closely to the amount of fine particulate material used as the preferred matrix component of the refractory mix. Thus, in accordance with the present invention, the refractory mix is comprised essentially of the weight percentages set forth in the following table.

| Component | Percentage Range | Specific |
|---|---|---|
| Fused Alumina | 30–90 | 30.5 |
| Tabular Alumina | 0–40 | 28.2 |
| Alumina Fines (at least 0.1 sq. m./g.) | 1–20 | 18.9 |
| Chromium Sesquioxide (at least 0.4 sq. m./g.) | 5–25 | 9.2 |
| Fine Clay | 1–8 | 3.4 |
| Phosphate Binder | 1–10 | 6.0 |
| Water | 2–10 | 3.8 |

As mentioned, the predominent aggregate component is fused alumina of +60 mesh size which may be used alone or with other classes of alumina products. The particle size distribution within the aggregate portion of the composition will vary depending on the source of the material as well as its method of manufacture. Consequently, a particle size distribution comparable to that shown hereinbefore can be anticipated. Additionally, as noted in the foregoing table, the chromium sesquioxide generally exhibits a somewhat higher specific surface area than the fine alumina particles which may be of the fused, tabular or calcined type. As mentioned, the specific surface area is generally greater than 0.4 sq. m./g. and typically falls within the range of 0.5–2.0 sq. m./g. while the fine granular alumina generally falls within the range of 0.1–1.0 sq. m./g. Although the grain size of the specific clay employed will vary substantially, it is generally preferred that fine clays be utilized; that is, clays having an average particle size of less than about 75 microns. As will be appreciated, the finer the particle, the larger the surface area and the more rapid the surface diffusion rate of the chromia and alumina during the initial matrix solid solution formation phase of the firing operation. Thus, a typical particle size distribution for the chromium sesquioxide used herein is set forth below, this material exhibiting a specific surface area of 0.53 sq. m./g.

| Particle Size (Microns) | Percentage |
|---|---|
| 10.1 | 0 |
| 8 | .4 |
| 6.35 | 1.3 |
| 5.04 | 2.1 |
| 4.0 | 4.4 |
| 3.175 | 7.2 |
| 2.52 | 11.5 |
| 2.0 | 20.9 |
| 1.587 | 22.8 |
| 1.26 | 13.4 |
| 1.0 | 9.4 |
| 0.794 | 4.0 |
| 0.63 | 1.4 |
| 0.5 | 0.7 |
| 0.397 | 0.6 |

The present invention is primarily concerned with a plastic refractory mix of the phosphate bonded type. The bonding agent employed is an aluminum phosphate binder such as polymerized aluminum phosphate or polymerized aluminum chlorophosphate, or mixtures thereof which provide the green mix with sufficient cohesive forces during drying and initial firing. The binder imparts excellent plasticity in conjunction with the plastic clay component together with retention of the plasticity and shelf life in the mix. Any one of the known phosphate binder systems may be employed.

The system of the present invention provides a dual bonding system which includes a chemical bond operative upon mixing of the components and during the drying and baking operation and a ceramic bonding system which gradually replaces the chemical bond without destroying it during the firing operation. As is known, the initial chemical bond provided by the phosphate binder system will disassociate at high temperatures, resulting in the formation of finely divided aluminum oxide and phosphorus pentoxide vapor near a temperature of 1750° C. It is, therefore, important that the chemical bond be replaced prior to its decomposition so as to obviate a possible weak temperature range. Thus, the bonding system of the present invention provides a second bonding component which matches the chemical bond and gradually replaces it without destroying it; namely, the development of a ceramic bond at a temperature well below the decomposition temperature of the chemical bond.

In accordance with the present invention, the second bonding component of the bonding system is a ceramic bond which initiates its formation well below the chemical bond's decomposition temperature and, in fact, initiates its formation as early as about 1350°–1400° C. In accordance with the present invention, this is achieved through the fine particle components of the matrix and particularly through the utilization of matrix materials exhibiting high specific areas which achieve as much surface contact as possible between particles. This high surface contact, achieved through high specific surface area, facilitates the early formation of the ceramic bond by providing a high alumina-chromium sesquioxide solid solution on the surface of both the fine and large particles of the refractory mix. The progress of the solid solution formation is by way of bilateral diffusion between the alumina and the chromium sesqioxide particles in contact therewith. Thus, the utilization of a matrix which exhibits not only small particle size but also particle surface shapes that result in a high specific surface area provides optimum conditions for contact between the alumina and chromia particles and thereby tends to promote the formation of the solid solution at the desirable low temperature of 1350°–1400° C.

The bilateral diffusion between the alumina and chromia particles promotes a solid solution formation as the firing temperature is increased. In this connection, the utilization of high purity materials such as chromium sesquioxide having a chromium oxide content of better than 99% together with the utilization of a fine clay and high alumina component having a substantially low impurity level results in the formation of a trigonal alumina-chromium sesquioxide solid solution phase and the suppression of the unwanted cubic spinel phase while the chemical bond is still operative. The reduction of this spinel phase and the promotion of the trigonal solid solution phase has been studied heretofore and reference is made herein to the discussion contained within the Benner et al U.S. Pat. No. 2,279,260.

By excluding the impurities such as the cations of iron, magnesium, calcium and the alkali metals from the raw materials used for the matrix, it is also possible to avoid the formation of crystalline acid salts, the crystallization of which would remove and diminish water from the plastic refractory mix composition and thereby reduce the plasticity thereof. Thus, the clay that is employed is of a fine plastic clay other than the bentonite type clays with a combined alkali and alkaline earth metal content of less than 2.3% by weight in order to reduce the alkali and alkaline earth metal content of the matrix portion of the mix. In accordance with the present invention, the oxides of these impurity cations are maintained at a very low level, well below 1% of the formulation and preferably below 0.5% thereof. The suppression of the cubic spinel phase within the matrix helps to develop a highly abrasion resistant and high molten metal corrosion resistant refractory material while at the same time promoting the early formation of the trigonal crystal phase. The tough abrasion resistant trigonal solid solution phase not only provides resistance to the corrosive and erosive attacks of the open hearth and BOF steel slags, but also provides an extremely hard matrix that is even harder than corundum and promotes a ceramic bonding which results in transgranular fracture of the refractory rather than intergranular fracture. In other words, it has been found that upon breaking a formed and fired shape utilizing the refractory mix of the present invention, the break occurred across the body of the alumina aggregate grains rather than at the point of interconnection between the aggregate and the matrix or within the matrix.

As mentioned, the matrix formulation utilized in the refractory mix of the present invention promotes early development of the ceramic bonding, even at low firing temperatures. This result is believed to be due in part to the high purity materials utilized and in part to the high specific surface areas utilized for the matrix materials. These materials, after being intimately mixed, exhibit substantial surface contact between the particles and upon heating exhibit early development of the trigonal solid solution formation resulting in strong integral strength across the entire refractory body. This initial early ceramic bond formation can be noted by terminating the firing of the dried green mix at about 1400° C. and noting the dispersed violet color on the green background of the fractured surfaces. The violet color is a confirming indication of the initial formation of the trigonal solid solution and is readily apparent against the unchanged green color background that is indicative of a lack of early development of the solid solution.

A typical chemical analysis of the refractory mix of the present invention following firing is indicative of the high purity level of the initial components and the exclusion of the undesirable spinel forming components. This analysis of the mix of the present invention is set forth below on a calcined basis.

| Component | Percent |
|---|---|
| Aluminum Oxide | 84.7 |
| Silicon Dioxide | 2.3 |
| Ferric Oxide | 0.2 |
| Alkalies | 0.2 |
| Phosphorous Pentoxide | 3.0 |
| Chromium Sesquioxide | 9.6 |

In order to achieve the best results, it is necessary that the fine particles be intimately mixed so as to provide maximum surface contact between the particles. Thus, the mixing procedure utilized in accordance with the present invention requires intimate mixing of the fine particle components; namely, the high surface area alumina and chromia and the fine clay. These components are typically mixed in a dry condition, following which the aggregate alumina is added and blended with the fine particles. As the mixing progresses, the liquid phosphate binder and water is introduced into the mixture and the mixing is continued to provide the desired plasticity and moldability. Although overmixing is disadvantageous, the mix should be thoroughly intermingled to provide both good plasticity and a pliable consistency. Typically, the mixed and plasticized refractory mix is discharged from the mixer directly to an airtight packaging unit so as to obviate long exposure to air, thereby avoiding the formation of water insoluble aluminum phosphate formations or a skin film on the exposed surfaces. Typically, the practice followed for phosphate bonded monolithic structures of the wet, air set plastic type is used for the drying of the rammed, vibrated or pressed shapes. It is preferred that the initial dry-out phase be conducted at a relatively low temperature for long periods of time to allow maximum penetration of heat throughout the full thickness of the refractory body. Only then should the temperature be slowly increased to approximately the temperature where the chemical bonding starts to occur. The temperature then should be held at this point so as to get maximum penetration throughout the entire refractory mix.

The following examples are given in order that the effectiveness of the present invention may be more fully understood. The examples are set forth for purposes of illustration only and are not intended in any way to limit the practice of the invention. Unless otherwise specified, all parts are given by weight.

EXAMPLE 1

The following ingredients were mixed in accordance with the procedure described hereinbefore:

| Ingredient | Parts by Weight |
| --- | --- |
| Fused Alumina (−10 +50 mesh) | 30.51 |
| Tabular Alumina (4 mesh) | 28.20 |
| Tabular Alumina (specific surface area - 0.1 sq. m./g.) | 11.48 |
| Calcined Alumina (specific surface area - 0.25 sq. m./g.) | 7.48 |
| Chromium Sesquioxide (specific surface area - 0.53 sq. m.g.) | 9.21 |
| Fine Plastic Clay | 3.40 |
| Phosphate Binder | 6.01 |
| Water | 3.87 |

The fine particle alumina, chromium sesquioxide and clay were mixed in a dry state in a Muller type mixer for a sufficient period of time to permit thorough intimate mixing of the fine granular material. The fused and tabular alumina aggregate was then mixed with the dry fine particle mix to permit full contact therewith, following which the diluted binder was introduced in a sprinkling fashion as the mixing continued. After discharge of the plastic mix from the mixer, the material was placed in an airtight packaging unit without interruption in the process and was dried using the recommended procedure for phosphate bonded monolithic materials containing 85% and more alumina.

The mix, which exhibited a green bulk density of 3.68 g./cm$^3$ and a workability index of 36–44%, was heated to various temperatures and the physical properties were noted at the different temperatures as set forth in the following table.

| Firing temperature: | Linear change: ASTM C 179-72 | Apparent bulk density: ASTM C 20 | Modulus of rupture ASTM C 491-72 | Apparent porosity ASTM C 20 | Reheat change: ASTM C 113 |
| --- | --- | --- | --- | --- | --- |
| 110° C | — | 3.15 g/cm$^3$ | 104 kg/cm$^2$ | — | — |
| 540° C | −0.14% | 3.23 g/cm$^3$ | 139 kg/cm$^2$ | 12.6% | −0.88% |
| 1090° C | −0.03% | 3.23 g/cm$^3$ | 198 kg/cm$^2$ | 12.3% | −0.53% |
| 1370° C | −0.31% | 3.28 g/cm$^3$ | 313 kg/cm$^2$ | 10.1% | −0.29% |
| 1650° C | −0.77% | 3.32 g/cm$^3$ | 260 kg/cm$^2$ | 10.1% | +0.01% |

The small pore diameter and low apparent porosity, coupled with a high contact angle between the refractory surface and the molten steel slag, provide the high resistance of this material to slag penetration.

EXAMPLE 2

The formulation of Example 1 was prepared and formed into pressed bars in order to test the resistance of the material to corrosive-erosive attack by metal slags at high temperatures using the Dolomite Valley method. In accordance with this procedure, the mix was formed into test bars that were placed in a small rotary test kiln in an arrangement to form a central bore having a hexagonal cross sectional configuration thereby exposing one surface of each bar. The kiln was fired from the lower opening with a propane torch while slag pellets were fed from the upper end of the kiln as it was rotated at approximately 2½ revolutions per minute. The slag melted in the upper third and flowed as melted slag into the lower one-third of the kiln, making a pool and draining from the lower end. From the loss of the specific cross sectional area of the bars and the testing time, the rate of erosion was calculated.

In this test procedure, a semiacid slag was used and the material of the present invention was tested in comparison to a known high alumina plastic refractory material at a test temperature of 1730° C.

As a result of the test procedure, the rate of erosion was determined to be as set forth below:

| Test Material | Rate of Erosion |
| --- | --- |
| Present Invention | 6.7 × 10$^{-3}$ cm$^3$/cm$^2$ - hr. |
| Control Refractory | 12.6 × 10$^{-3}$ cm$^3$/cm$^2$ - hr. |

EXAMPLE 3

In the following example, the high alumina-chromia refractory material of the present invention was tested for comparative prism spalling resistance. In this test procedure, the refractory materials are exposed to multiple cycles of sudden temperature changes causing thermal shocks that produce fine cracking with propagating tendencies, deep cracks or even full disintegration of the refractory. Since the principal parameters of spalling resistance are low coefficient of thermal expansion, low thermal conductivity, high modulus of elasticity, and high tensile strength, the resistance of the material to the spalling conditions is an indication of these properties.

In this test procedure, three prisms of each test material were prepared, the prisms having dimensions of 5.1 cm × 5.1 cm × 7.6 cm. After drying to a constant weight at 110° C., the prisms were subjected to thermal shock cycles consisting of a twenty-minute firing at 1200° C. and immediate quenching in cold water for 20 minutes. The cycles were continued until disintegration of the test prisms was observed.

The control material was a leading chemically bonded 90 percent alumina plastic refractory. The control prisms disintegrated after six cycles while the refractory of the present invention did not disintegrate until twenty-six cycles had been completed. This extremely severe test confirms the remarkable thermal strength characteristics of the refractory mix of the present invention.

Superiority was evidenced in an induction furnace corrosion test with rammed test prisms of the same size immersed in molten gray iron and in AISI 1020 steel at 1650° C. The control specimens were washed away in twelve minutes while the specimens of the present invention withstood the erosive stream for an additional twenty minutes.

As will be apparent to persons skilled in the art, various modifications, adaptations and variations of the foregoing specific disclosure can be made without departing from the teachings of the present invention.

We claim:

1. In a high alumina-chromia plastic refractory mix of the type having a general aggregate to matrix ratio of about 2:1, the combination wherein the predominant aggregate component is fused alumina of high purity well suited for use in a plastic refractory mix and the matrix is comprised predominantly of materials having a high specific surface area of at least about 0.1 sq. m./g., the combined alumina-chromia content being in excess of about 80% by weight, the chromia being within the matrix and in an amount sufficient to provide a trigonal phase solid solution upon firing, said mix having a minimal magnesium oxide, iron oxide and alkali metal oxide content providing improved shelf life and plasticity and suppression of a spinel phase formation upon firing, said mix providing a dual bonding system comprising an initial chemical bond and the development of a ceramic bond at a temperature level where the chemical bond is still operative, the resultant refractory being characterized by an ability to withstand corrosive-erosive attack of molten metals and their acid, semibasic and basic slags during repeated exposure thereto, excellent volume stability and abrasive resistance and a low apparent porosity.

2. The refractory mix of claim 1 wherein fused alumina comprises 30-90% by weight of the mix and said matrix comprises chromia particles having a specific surface area greater than about 0.4 sq. m./g.

3. The refractory mix of claim 1 wherein said matrix comprises alumina having a fine particle size with a specific surface area of about 0.1-1.0 sq. m./g., chromia having a fine particle size with a specific surface area of about 0.4-2.0 sq. m./g. and a fine clay, the proportion of fine chromia to fine alumina being in the range of about 2:1 to 1:2.

4. The refractory mix of claim 1 wherein said matrix includes fine clay having an average grain size of less than about 75 microns, said clay being selected from the group consisting of bond clay, ball clay, kaolin and mixtures thereof.

5. The refractory mix of claim 1 wherein the chromia is a high purity material having a $Cr_2O_3$ content in excess of 99% and a specific surface area of 0.5-2.0 sq. m./g., said chromia constituting at least 5% by weight of the mix.

6. The refractory mix of claim 1 wherein said fused alumina aggregate exhibits an average particle size greater than 60 mesh.

7. The refractory mix of claim 1 wherein the components have a combined alkali, alkaline earth metal and total iron oxide content of about 0.5 percent by weight and less when measured as ferric oxide equivalent in the fired formulation.

8. The refractory mix of claim 1 including 1-10% by weight of a phosphate binder and 1-8% by weight of a fine clay having a grain size of less than about 75 microns.

9. The refractory mix of claim 8 wherein said fine clay has a combined alkali and alkaline earth metal content of about 2.3 percent by weight and less.

10. The refractory mix of claim 1 wherein the chromium sesquioxide exhibits a particle size of less than about 10 microns.

11. A high alumina-chromium sesquioxide phosphatebonded refractory mix comprising by weight:
   30-90% fused alumina aggregate
   0-40% tabular alumina aggregate
   1-20% alumina fines of at least 0.1 sq. m./g. specific surface area
   5-25% chromium sesquioxide fines of at least 0.4 sq. m./g. specific surface area
   1-8% fine clay
   1-10% phosphate binder
   2-10% water
said chromium sesquioxide and alumina fines being adapted to form a trigonal phase solid solution matrix having an initial formation stage of at least about 1350° C.-1400° C.

12. The refractory mix of claim 11 wherein the alumina aggregate exhibits an average particle size greater than 60 mesh.

13. The refractory mix of claim 11 wherein the chromium sesquioxide exhibits a particle size of less than about 10 microns.

* * * * *